United States Patent [19]
Roberts et al.

[11] Patent Number: 5,358,764
[45] Date of Patent: Oct. 25, 1994

[54] INTEGRALLY MOLDED T-SHAPED DECORATIVE TRIM

[75] Inventors: Edward A. Roberts, Mt. Clemens; Raymond C. Brautigam, Shelby Township, Macomb County, both of Mich.

[73] Assignee: Color Custom, Inc., Warren, Mich.

[21] Appl. No.: 135,846

[22] Filed: Oct. 13, 1993

Related U.S. Application Data

[60] Continuation of Ser. No. 788,618, Nov. 6, 1991, abandoned, which is a continuation-in-part of Ser. No. 707,582, May 30, 1991, abandoned, which is a continuation-in-part of Ser. No. 574,603, Aug. 29, 1990, Pat. No. 5,112,549, which is a division of Ser. No. 114,500, Oct. 30, 1987, Pat. No. 4,963,403.

[51] Int. Cl.⁵ .............................................. B60R 27/00
[52] U.S. Cl. .................................. 428/31; 296/93; 428/122; 428/212; 428/213; 428/217; 428/220; 428/423.1; 428/425.9; 428/424.6; 428/458; 428/462; 428/480; 428/483; 428/518; 428/520; 428/522; 428/689

[58] Field of Search ............... 428/31, 122, 212, 220, 428/213, 425.9, 217, 458, 480, 423.1, 424.6, 483, 520, 518, 522, 462, 689; 49/475; 292/DIG. 70; 296/93

[56] References Cited

U.S. PATENT DOCUMENTS

| | | | |
|---|---|---|---|
| 4,349,994 | 9/1982 | Maekawa | 428/122 |
| 4,369,225 | 1/1983 | Manabe | 428/31 |

FOREIGN PATENT DOCUMENTS

| | | | |
|---|---|---|---|
| 2945836 | 5/1981 | Fed. Rep. of Germany | 428/31 |
| 3110989 | 9/1982 | Fed. Rep. of Germany | 428/31 |
| 1189105 | 4/1970 | United Kingdom | 428/31 |

*Primary Examiner*—Ellis P. Robinson
*Assistant Examiner*—Nasser Ahmad
*Attorney, Agent, or Firm*—Brooks & Kushman

[57] ABSTRACT

Disclosed is a decorative trim assembly comprising an integrally molded T-shaped decorative trim comprised of a hard plastic leg portion with a top portion. A soft plastic tip portion is bound to the top of the leg, and a decorative metallic portion is molded to the top of the leg portion, and at the edge of the leg portion, a locking flange member. A multi-channel member having a first channel for insertion of glass and a second channel for insertion of the plastic stem portion therein in locking engagement is also disclosed.

12 Claims, 2 Drawing Sheets

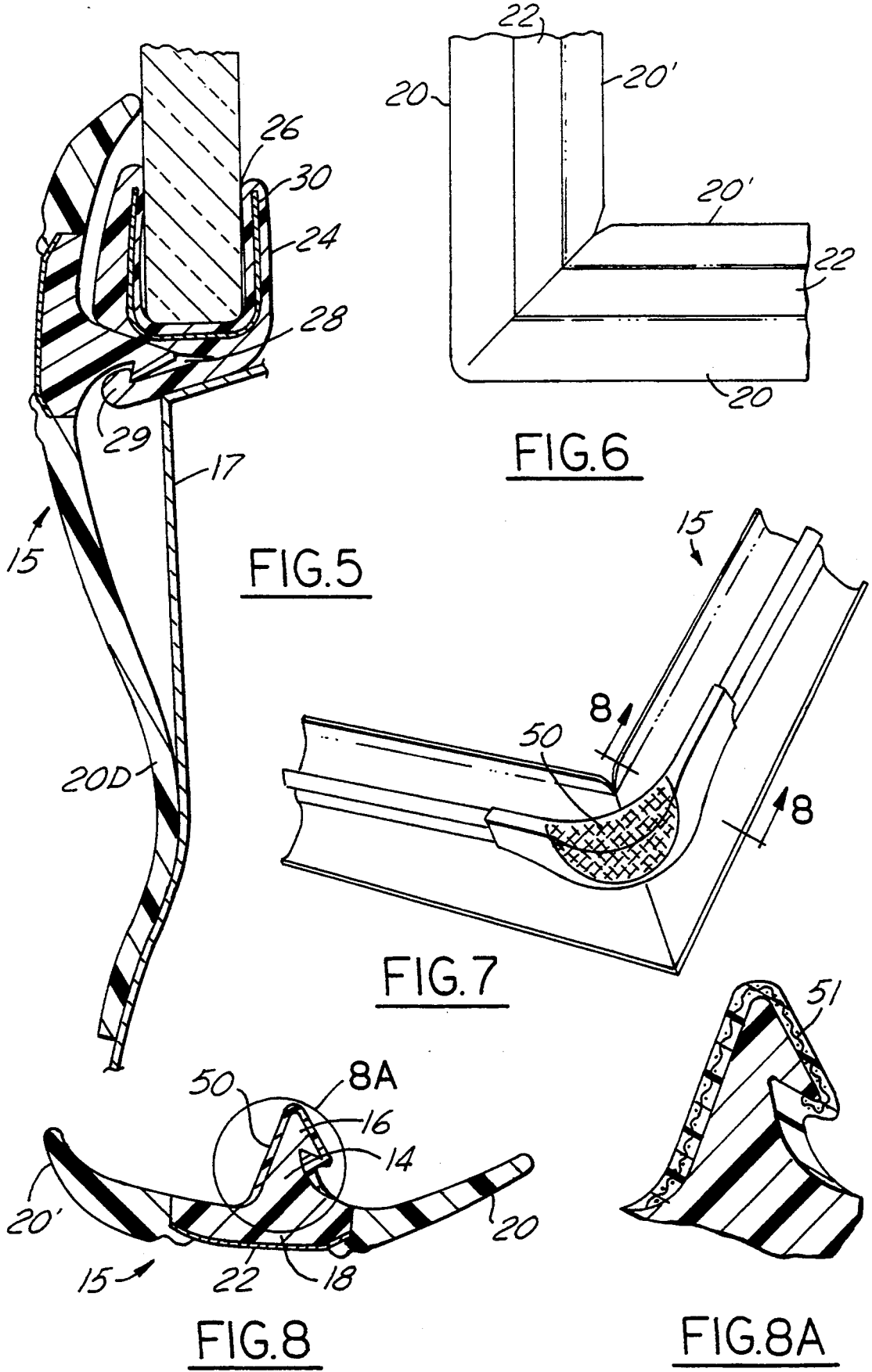

INTEGRALLY MOLDED T-SHAPED DECORATIVE TRIM

CROSS-REFERENCE TO RELATED APPLICATION

This application is a continuation of U.S. Ser. No. 07/788,618, filed Nov. 6, 1991 now abandoned which is a continuation-in-part of U.S. Ser. No. 707,582, filed May 30, 1991 now abandoned which is a continuation-in-part of U.S. Ser. No. 574,603, filed Aug. 29, 1990 now U.S. Pat. No. 5,112,549, which is a division of U.S. Ser. No. 114,500, filed Oct. 30, 1987, now U.S. Pat. No. 4,963,403, issued Oct. 16, 1990, all of which are hereby incorporated by reference.

TECHNICAL FIELD

The present application is concerned with integrally molded T-shaped decorative trim and their use in assemblies for retaining glass, especially useful in the transportation industry.

BACKGROUND ART

U.S. Pat. No. 4,582,739 to Givens describes an edge and corner protective bumper. U.S. Pat. No. 4,783,931 to Kirkwood describes a glass-run channel having a metal core of general S-shape. The metal core has a continuous unbroken strip and a plurality of transversely extending slits forming between them barbs or ribs extending transversely from the unbroken strip, the core being covered with an elastomer.

U.S. 4,787,187 to Feldman describes a trim strip for covering the gap between a window glass and a window frame consisting of a decorative strip covering the gap with a web projecting obliquely from the ladder that can be inserted into the gap.

U.S. Pat. No. 4,929,490 Iwasa describes a window frame rubber molding for automobiles. U.S. Pat. No. 4,935,269 Fisher et al describes a longitudinal side edge of a motor vehicle and profiled strip combination.

Plastic molded strips have been utilized in the appliance and motor vehicle industry to interconnect parts. Extrusions of one or more type of plastic to form a resultant plastic part are described in U.S. Pat. Nos. 4,087,223, Angioletti et al; 4,269,897 Gans et al; 4,381,273 Azzoll; 4,470,943 Preis; 4,563,141 Zoeller; 4,581,807 Addell; and 4,643,659 Paul.

Color light-reflected composite molding is described in U.S. Pat. No. 3,547,516. A multi-part plastic fastener is described in U.S. Pat. No. 4,708,895, Mizusawa. Decorative plastic extrusions are described in U.S. Pat. No. 3,440,129 Amselm. Decorative members having transparent layer with a lens effect is described in U.S. Pat. No. 4,748,062 to Menjo et al. Decorative trim strips having foil members whose upper surface is provided with a decorative pattern is described in U.S. Pat. No. 4,560,596 to Coscia.

None of the prior art suggests an integrally molded T-shaped decorative trim which is comprised of hard and soft plastic portions with an integrally molded decorative metallic portion such as stainless steel which is uncovered and available to touch which trim cooperatively engages a dual channel element to which the trim locks and in which the glass panel fits.

SUMMARY OF THE INVENTION

Disclosed is a decorative trim assembly comprising an integrally molded T-shaped decorative trim comprised of a hard plastic leg portion with a top portion, soft plastic tip portions bound to the top of the leg, a decorative metallic portion molded to the top of the leg portion, and, at the edge of the leg portion, there is a locking flange member. A multi-channel member having a first channel for insertion of glass and a second channel for insertion of the plastic leg portion therein in locking engagement is also disclosed.

BRIEF DESCRIPTION OF THE DRAWINGS

FIG. 5 is a cross-sectional view of another embodiment of the integrally molded decorative trim assembly of the present invention;

FIG. 6 is an enlarged top view of the corner of the trim assembly of FIG. 1;

FIG. 7 is the bottom view of FIG. 6;

FIG. 8 is a side sectional view along lines 8—8 of FIG. 7; and

FIG. 8A is an exploded view of a portion of FIG. 8.

DESCRIPTION OF PREFERRED EMBODIMENTS

Figure 1:
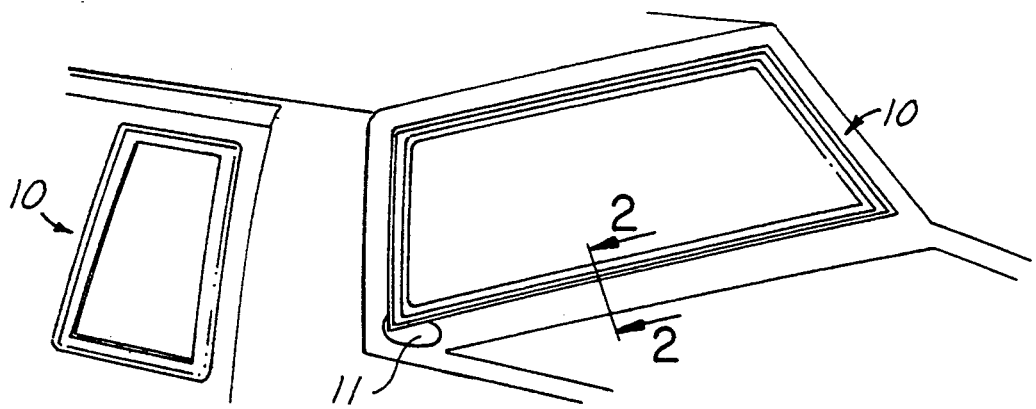
FIG. 1 is a view of the decorative trim assembly of the present invention in the environment of holding vehicular glass.

The integrally molded T-shaped decorative trim assembly of the present invention is described in the environment as shown in FIG. 1 which is an automobile with the decorative trim 10 that can be located for holding the side or rear glass 12 of an automobile and also to allow water 11 to drain away from the glass and assembly. The decorative trim 10 frictionally engages the glass 12 by the use of an integrally molded T-shaped decorative trim. The decorative trim 10 retains the glass 12 in place by the use of a integrally molded T-shaped decorative trim which has a leg portion 14 which, in turn, has an edge portion 16 and spaced from the edge portion a top portion 18. The tips of the T as shown by 20 and 20' are integrally molded with a decorative metallic portion 22 molded in place in general at the top 18 of the T or at the top of the leg portion 14.

FIGS. 5–7 describe in more detail the assembly that utilizes the decorative trim.

The assembly is a two-part assembly containing the T-shaped decorative trim 15 together with the multi-channel member 24 which has glass receiving means 26 and leg receiving means 28 in which the leg 14 and edge 16 fit. The multi-channel member 24 is generally comprised of appropriately configured metallic support 30 with polyvinyl chloride or other hard plastic formed about the support metal. In general, the channel is U-shaped in which the glass 12 fits and the leg is V-shaped in which the edge 16 fits. During assembly, the multi-channel member 24 can be used to hold the glass in place and then the T-shaped decorative trim is snapped into channel 28, leg receiving means. To assist the hard plastic 50 in retaining its integrity, a stainless steel mesh 51 is inserted within the plastic 50 in order to ensure the integrity of the assembly. The stainless steel that is utilized is comparable to that which is described above. To retain the two-part assembly in place, leg receiving means also has a cooperatively engaging locking edge 29 which cooperates with leg edge 16. The decorative trim can be slid through the channel 28 to reach the desired end point as shown in FIGS. 2–5. Because the multi-channel member 24 is of a malleable metal, and plastic, it may be cut to a desired length.

During the molding process, the decorative metallic trim 22 is molded in place. Because the plastic that is used to form the tips 20,20' is of a soft plastic, that plastic (not shown) forms atop the decorative metallic trim. That plastic piece is a protective piece that can be stripped during the manufacturing process or after the decorative trim reaches its final assembly and just prior to use. During the manufacturing process, that excess plastic may be cut-off with a plurality of aligned cutting rollers to permit the removal of the plastic and ready view of the decorative metallic trim.

A preferred embodiment is shown in FIG. 8 wherein the leg 14 is comprised of a plastic that is harder and has a higher durometer reading than the tips 20,20'. As can be seen from FIGS. 2, 5 and 8, to insure the retaining of the decorative metallic trim 22 in the T-shaped decorative trim, the metallic piece is molded into the hard plastic. This gives a firmer seating for the metallic portion.

With respect to the rigid or hard plastic leg portion 14, the plastic that may be used is any material that would be rigid at ambient temperature and pressure and would be relatively stable at operating temperatures for vehicular traffic (−40° F. to 130° F.). A preferred plastic is rigid polyvinyl chloride having a Shore D durometer hardness. The plastic may also be ABS (Rovel type ABS i.e., acrylonitrile butadiene styrene). Other plastics may be used such as thermoplastic materials such as polyurethane, polyester materials derived from polyterephthlate and polyvinyl chloride. The preferred rigid plastic is rigid polyvinyl chloride having a Shore D hardness of about 90.

The tips of the soft plastic 20 and 20' can generally be a flexible thermoplastic material that can be integrally bonded or molded during the formation process. Such material should be compatible with the hard plastic. The plastic is preferably a thermoplastic polyvinyl chloride, polyurethane, polyester such as described above. Preferably, the material is a thermoplastic flexible polyvinyl chloride material having a Shore A hardness.

It is to be appreciated that other materials are added to the plastic such as filler materials which can reinforce the composition such as calcium carbonate filler, talc, clay such as calcium metasilicate, silicon dioxide, sodium potassium aluminum silicate, feldspar, and the like. Pigment can also be added for coloring purposes such as carbon black and the like. Antioxidants may also be added to help stabilize the thermoplastic material against degradation by ultraviolet light, infrared light and the like.

The metallic element 22 is preferably of a metal that can withstand the atmospheric exposure and at the same time, can be molded into the T-shaped trim. The metal that can be used is any one that can readily form an oxide or does not degrade significantly. Suitable metals would be stainless steel of varying nickel iron chromium content, aluminum and nickel chromium alloys and the like. A preferred material is stainless steel having a thickness of about 1 to about 10 mils, preferably about 4–6 mils in thickness. The stainless steel is stainless steel No. 304 F-4.

Figure 2:
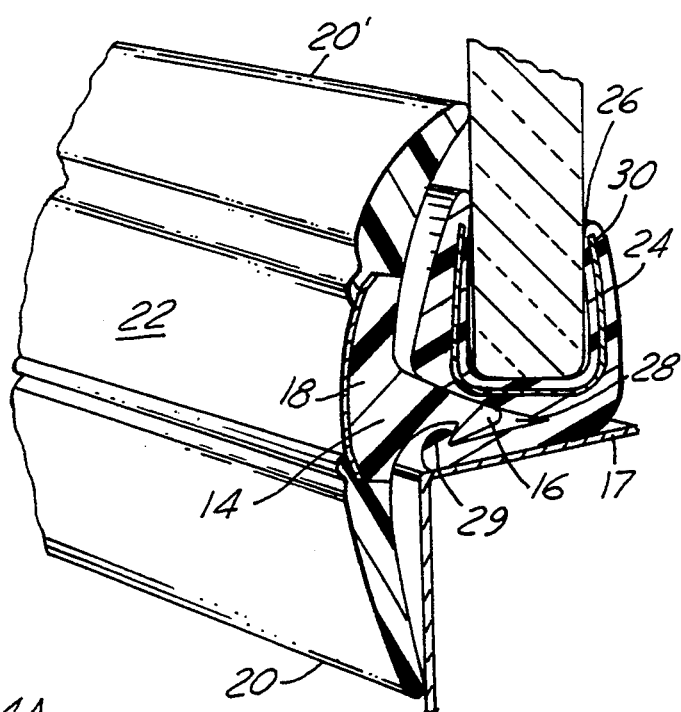
FIG. 2 is a view taken along the lines 2—2 of FIG. 1.
Figure 3:
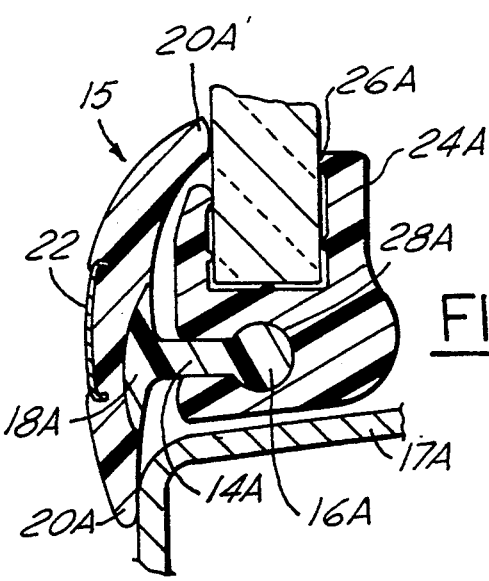
FIG. 3 is one embodiment of the integrally molded decorative trim assembly of the present invention.
Figure 4:
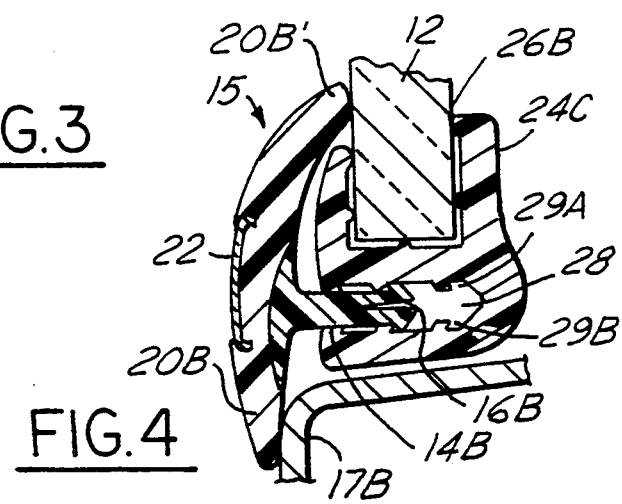
FIG. 4 is a cross-sectional view of another embodiment of the integrally molded decorative trim assembly of the present invention.

Alternative embodiments of the present invention are shown in FIGS. 3–5. FIG. 3 is an all plastic material with the exception of the decorative trim 22. The leg portion is shown as 14a with the edge portion 16a shown with the top portion 18a. In this embodiment, the portions 14a, 16a and 18a are comprised of a rigid plastic material of the same type as described above. The top portion of the T, as 20a and 20a', is comprised of the same flexible material as described above. In FIG. 3, the metallic element 22 is molded directly into the flexible plastic 20a and 20a'. The flexible plastic top of the "T" joins the leg and is integrally molded thereto with the rigid plastic. The multi-channel member that is identified as 24a is all plastic without the metallic insert as shown in FIGS. 2 and 5. The glass 12 is still retained in place. The bulb-like extremity 16a fits within groove 28a of second element 24a. The second channel 26a is one in which the glass 12 resides when in place. Obviously, metallic supports may be put into place in the multi-channel member or even in the T-shaped member as a rod (not shown).

FIG. 4 is an alternative embodiment to the invention where the leg 14b functions comparable to that shown in FIGS. 2 and 3. The distinction is that the leg has multiple locking edge portions. These edges or barbs permit their insertion into one of three separate locking edge means edge 29a and 29b of the multi-channel member 24c. In essence, these are long channels in which the edge or barbs of the leg member can be inserted for different locking positions. The remainder of the decorative trim assembly is substantially the same, namely, that the flexible plastic is shown as 20b and 20b' with the metallic element 22 inserted therein.

Similar to the assembly of FIG. 3, the glass 12 fits within channel 26b of the second member 24c and no metal is used for support purposes as depicted in FIG. 4.

The vehicular window support segment 17 is shown in FIG. 2 with its comparable 17a shown in FIG. 3 and 17b shown in FIG. 4.

An additional preferred embodiment is shown in FIG. 5 where a longer flexible portion 20d is molded of the same thermoplastic described above. The advantage of the longer portion is to decrease the chance of water or other material from getting under the assembly. It is about 2–4 times the width of the opposite flexible member 20.

FIGS. 6–8 show a corner portion of the assembly 10. After the formation of the T-shaped member, it can be formed by injection molding into full assembly 10 as in FIG. 1. The corners are held in place by a hard plastic 50 placed upon the appropriately configured trim and has a hardness of about 90 Shore D.

In manufacturing the T-shaped trim of this invention, commercially available injection molding machines are utilized such as New Barry. They are operated at a temperature of 210° to 260° F. and are operated at ambient room pressure. Suitable dies can be utilized to conform to the trim that one wishes to prepare. Die such as that shown in parent application Ser. No. 114,500, filed Oct. 30, 1987 may likewise be used.

While forms of the invention herein disclosed constitute presently preferred embodiments, many others are possible. It is not intended herein to mention all of the possible equivalent forms or ramifications of the invention. It is understood that the terms used herein are merely descriptive rather than limiting and that various changes may be made without departing from the spirit or scope of the invention.

What is claimed is:

1. A vehicular decorative trim assembly in combination comprising:
   (a) an integrally molded T-shaped decorative trim comprised of a hard plastic leg portion having a top portion and an edge portion, soft plastic tip portions bound to the top portion of the hard plastic leg portion, a decorative metallic portion integrally molded to one of the top portion or the tip portions, and, at the edge portion of the hard plastic leg portion, a locking flange member; and
   (b) a multi-channel member having a first channel for insertion of a panel of glass and a second channel for insertion of the edge portion of the hard plastic leg portion therein in snapped-into engagement.

2. The assembly of claim 1 wherein the hard plastic is a thermoplastic material.

3. The assembly of claim 2 wherein the hard plastic is a thermoplastic selected from the group consisting of polyurethane, polyvinyl chloride, polyester, and acrylo nitrile-butadiene-styrene.

4. The assembly of claim 3 wherein the hard plastic is a rigid thermoplastic polyvinyl chloride having a Shore D durometer hardness.

5. The assembly of claim 1 wherein the soft plastic is comprised of a flexible thermoplastic polyvinyl chloride.

6. The assembly of claim 5 wherein the polyvinyl chloride has a Shore A hardness and is softer than the hard rigid plastic.

7. The assembly of claim 1 wherein the decorative metallic portion is comprised of a nickel chromium alloy.

8. The assembly of claim 1 wherein the metallic element is comprised of a nickel containing stainless steel alloy.

9. The assembly of claim 1 wherein the metallic element is from about 1 to about 10 mils in thickness.

10. The assembly of claim 1 wherein the multi-channel member is comprised of a rigid plastic material.

11. The assembly of claim 1 wherein the hard plastic material has contained therein a metallic support.

12. The decorative trim assembly of claim 1 wherein the second channel and the edge portion have mating hook-shaped portions.

* * * * *